INVENTORS.
LOUIS A. KANDLE
EUGENE HINDIN
PETER J. D'ORAZIO
BY Nielman and Jacobs
ATTORNEYS.

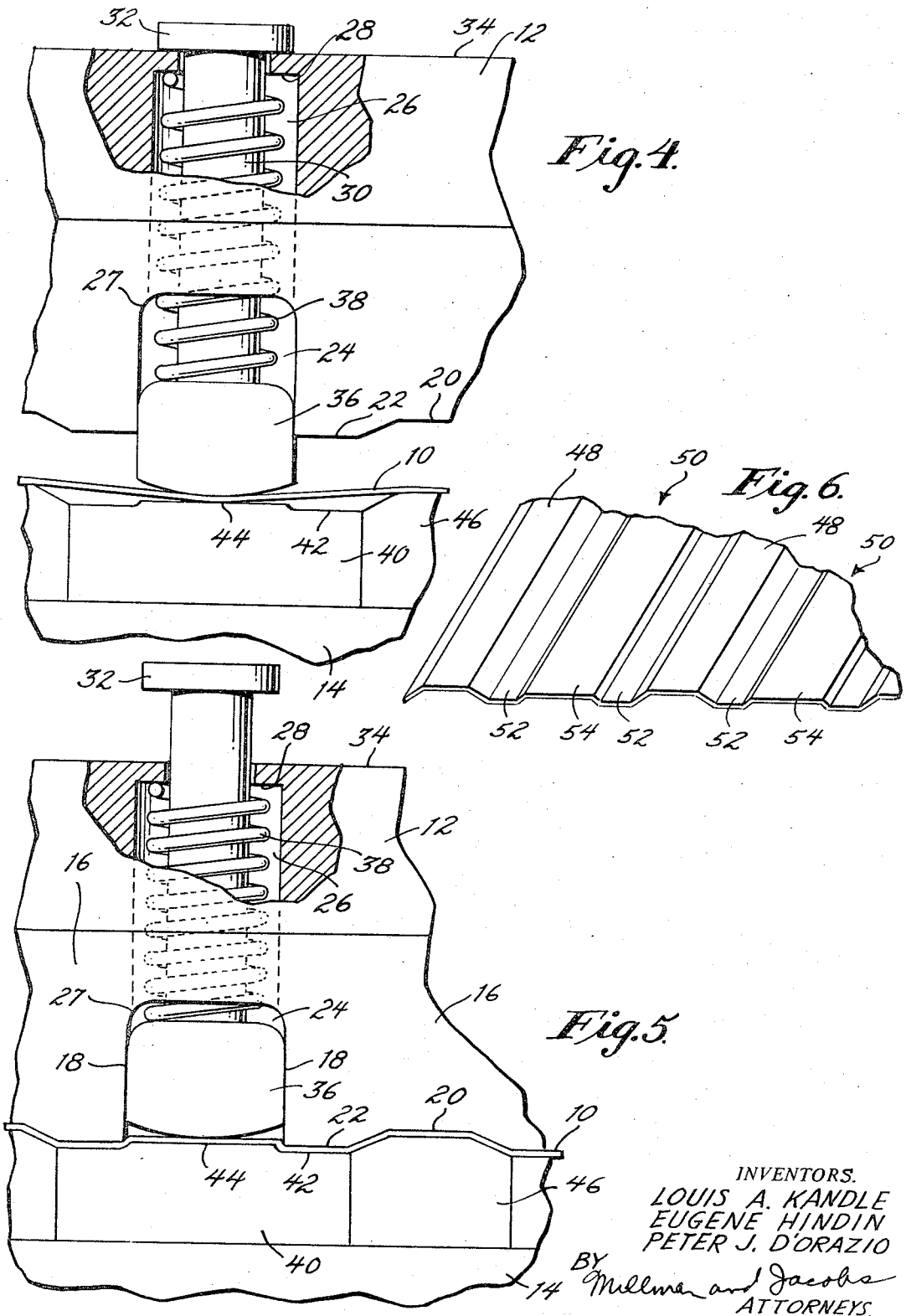

3,340,719
APPARATUS AND METHOD OF PRODUCING MULTIPLE CORRUGATIONS SIMULTANEOUSLY
Louis A. Kandle and Eugene Hindin, Philadelphia, and Peter J. D'Orazio, Southampton, Pa., assignors to Strick Corporation, Fairless Hills, Pa., a corporation of Pennsylvania
Filed Oct. 28, 1964, Ser. No. 407,029
5 Claims. (Cl. 72—385)

This invention relates to relatively large corrugated metallic sheets of steel, aluminum and the like metals for use in the construction of vehicle bodies and other applications.

Heretofore, the prevalent method of making multiple corrugations in a relatively large metallic sheet was to advance the sheet relative to the corrugation die in predetermined intervals and thus produce corrugations one at a time. The method is time-consuming and expensive.

It is the primary object of this invention to provide a method and apparatus for producing multiple corrugations in a relatively large metallic sheet simultaneously thus overcoming the aforementioned disadvantages.

Another object of the invention is to provide a method and apparatus for producing multiple corrugations in a metallic sheet simultaneously in which the sheet is pre-gathered without distortion into the female die cavities prior to the final application of all of the male dies as a unit so that the final shrinkage or shortening of the sheet is held to a minimum.

Another object of the invention is to provide a method and apparatus for producing multiple corrugations in a metallic sheet simultaneously in which the sheet is pre-gathered without distortion into the female die cavities prior to the final application of all of the male dies as a unit so that the final shrinkage or shortening of the sheet is held to a minimum, the pre-gathering being accomplished by the application of spring-loaded non-distorting forces first to the center and then progressively outwardly to the ends of the sheet by which the sheet is placed in a wave form with its troughs extending into the female die cavities prior to the final stroke of the male dies.

Another object of the invention is to provide apparatus for producing multiple corrugations in a metallic sheet simultaneously including upper and lower cooperating dies of such construction and configuration as to compensate for spring back of the corrugated sheet after its release from the lower die.

These and other objects of the invention will become more apparent as the following description proceeds in conjunction with the accompanying drawings, wherein:

FIG. 4 is an enlarged elevational view, with parts broken away and in section, showing the spring-loaded hold-down pad as it contacts the metallic sheet;

FIG. 5 is a view similar to FIG. 4 showing the position of the hold-down pad at the final stroke; and FIG. 6 is a fragmentary perspective view of the corrugated sheet produced by the instant method and apparatus.

Specific reference is now made to the drawings in which similar reference characters are used for corresponding elements throughout.

Figure 1:
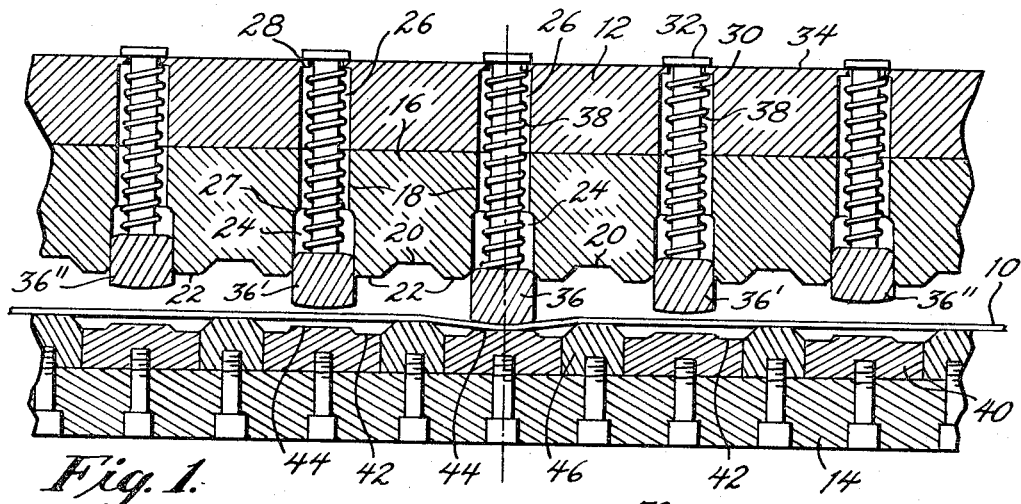
FIG. 1 is a fragmentary vertical sectional view through the instant apparatus illustrating the first step in the method.

The instant invention is designed to simultaneously produce multiple corrugations, for example thirty, in a relatively large sheet 10, for example ten feet long by two and one-half feet wide, of aluminum, steel or similar metal for use in the construction of trailer bodies or other applications.

A conventional press is provided having an upper shoe 12 movable vertically towards and away from a lower shoe 14. Appropriately secured to the upper shoe is a series of male dies 16 of desired configuration having vertical side edges 18 and a lower surface substantially hat-shaped in vertical section including a central indentation or crown portion 20 and depending side or brim projections 22. Each vertical side edge 18 of one male die is spaced from that of an adjacent die to provide an enlarged bore 24 which is communicative with an upper reduced bore 26, there being an internal shoulder 27 between the bores and a further internal shoulder 28 at the top of bore 26.

Slidably mounted in each of the combined bores 24 and 26 is a rod or pin 30 having a head 32 adapted to bear on the upper surface 34 of the upper shoe 12 to limit the downward movement of the pin. The lower end of the pin carries a holddown pad 36 whose diameter approximates that of the lower bore 24. A coil spring 38 is wound about the pin and bears against the pad 36 and the upper shoulder 28 and is biased to urge the pad outwardly of the lower surface of the male dies, the pad being adapted to engage the shoulder 27 against action of the spring to limit upward movement of the pad and pin as suggested in FIG. 5. It will be seen from FIGS. 1–3 that the central pad 36 extends beyond the male dies a distance greater than the two pads 36' on both sides thereof, which in turn extend beyond the dies a greater distance than the next two pads 36" and so on progressively for the full length of the upper die shoe or length of the metallic sheet 10 to be corrugated. The mounting of the hold-down pads to effect this progressive arrangement can be effected by using springs 38 of the same rating and pins of varying lengths or pins of the same length and springs of varying ratings.

Appropriately mounted on the lower shoe 14 is a series of female dies 40 each having a cavity including a peripheral portion 42 corresponding to the projections 22 of the male dies and a central raised portion 44 which is substantially coextensive with the pads 36. Mounted on the lower shoe between the female dies are land members 46 which extend beyond the portions 44 and correspond to and are adapted to coact with the indentations or crown portions 20 of the male dies.

Figure 2:
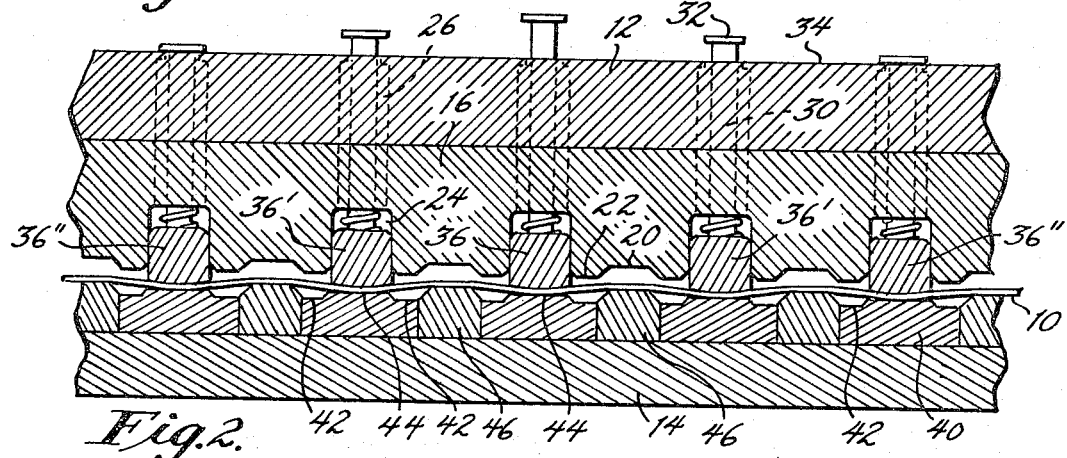
FIG. 2 is a view similar to FIG. 1 showing the subsequent steps in the method.
Figure 3:
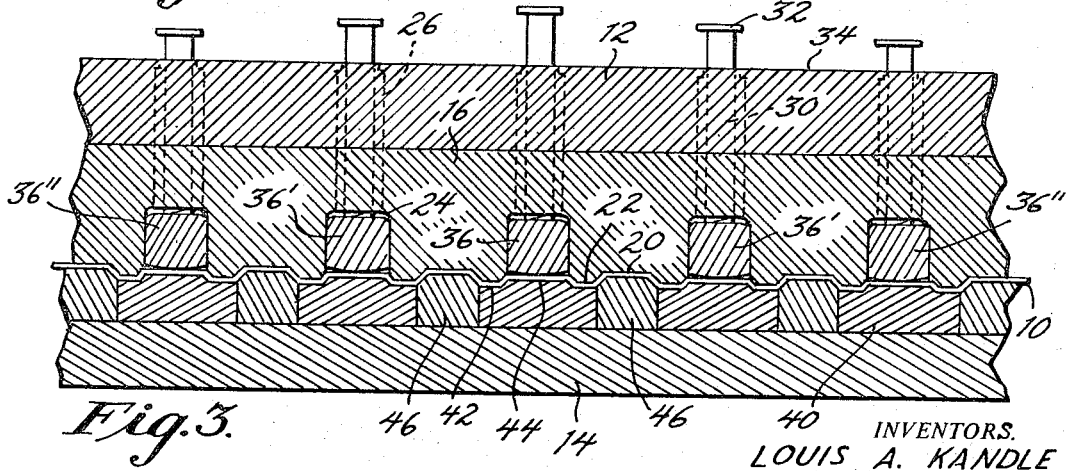
FIG. 3 is a view similar to FIG. 1 showing the final stroke of the upper die to produce the multiple corrugations simultaneously.

In use, the sheet 10 is laid over the female dies and rests upon the land members 46. The upper shoe is then lowered. As seen in FIG. 1, the central spring-loaded pad 36 is the first to contact the sheet and urge it into the cavity of the central female die. In so doing, the sheet is centrally pre-gathered or drawn into the central female die cavity without distorting the same, i.e. without applying stress on the sheet or stated another way without exceeding the elastic limit thereof. As the upper shoe moves down the next two spring-loaded pads 36' act similarly upon the sheet to draw the material, without distortion, into the corresponding female die cavities, and so on for pads 36" and the rest of them for the full length of the upper shoe or length of metallic sheet, as seen in FIG. 2. As the final stroke, generally about ¼", approaches, all spring-loaded pads are acting to hold the sheet in wave form, without stresses thereon, in all of the female die cavities, with the pads confined in the lower bores 24. In the final stroke the male dies 16 press and distort the sheet into the desired corrugations as seen in FIGS. 3 and 5.

The arrangement of the hold-down pads as shown and described minimizes overall shrinkage of the sheet as pregathering of the material, without stress, commences centrally of the sheet and proceeds progressively outwardly towards its ends. It has been found in practice that for aluminum sheets 10 feet long by 2½ feet wide in which 30 corrugations are made by the instant invention, an overall shrinkage in the order of magnitude of only 0.1% occurs. This is compensated for by spacing the land portions 46 apart an additional 0.1%.

The final corrugated sheet is shown in FIG. 6 and comprises crests 48 equivalent to the interaction between the land portions 46 and indentations 20 of the lower and upper dies and troughs 50 which follow the configurations of the female dies (members 42 and 44). Thus the troughs included indented portions 52 separated by a raised portion 54 which is shorter in height than that of the crests 48. In practice it was found that sheets having corrugations with a crest height of ¾6″ and a height of ¼32″ for the intermediate trough portion 54 are preferred in applications for the construction of trailer bodies. The intermediate portions 54 in the troughs serve to prevent spring back of the corrugated sheet after its release from the lower die.

While a preferred embodiment of the invention has here been shown and described, it will be understood that skilled artisans may make minor variations without departing from the spirit of the invention and the scope of the appended claims.

We claim:

1. A method of forming a plurality of corrugations simultaneously in a metallic sheet, comprising laying the sheet over a member containing a plurality of female dies having cavities of desired configurations, applying a pregathering force upon the sheet sufficient only to produce a wave form therein whose troughs extend into the die cavities without exceeding the elastic limit of the sheet, and then applying a plurality of male dies corresponding to the female dies simultaneously to the sheet with a force sufficient to mold the same in the female die cavities to thereby minimize overall shrinkage of the corrugated sheet.

2. A method of forming a plurality of corrugations simultaneously in a metallic sheet, comprising laying the sheet over a member containing a plurality of female dies having cavities of desired configurations, applying a pregathering force centrally to the sheet sufficient to cause the same to enter the central die cavity without exceeding the elastic limit of the sheet, applying similar forces to the sheet so that the same enters die cavities on both sides of said central cavities in pairs and sequentially for the full length of said member, and then applying a plurality of male dies corresponding to the female dies simultaneously to the sheet with a force sufficient to mold the same in the female die cavities to thereby minimize overall shrinkage of the corrugated sheet.

3. A method of forming a plurality of corrugations simultaneously in a metallic sheet, comprising laying the sheet over a member containing a plurality of female dies having cavities of desired configurations, applying pregathering spring-loaded forces to the sheet without exceeding the elastic limit thereof progressively outwardly from the center thereof sufficient to cause the sheet to enter first the central female die cavity and then sequentially the female die cavities on both sides of the central cavity for the full length of said member, and then applying a plurality of male dies corresponding to the female dies simultaneously to the sheet with a force sufficient to mold the same in the female die cavities to thereby minimize overall shrinkage of the corrugated sheet.

4. Apparatus for forming a plurality of corrugations simultaneously in a metallic sheet comprising a lower shoe mounting a plurality of female dies having cavities of desired configurations, an upper shoe movable vertically towards and away from said lower shoe and mounting male dies corresponding to said female dies, and spring-loaded pads carried by said upper shoe extending through said upper shoe and adapted to contact the sheet and cause it to enter said female die cavities without distortion prior to the final stroke wherein said male dies act to press and distort the sheet in said female dies, said pads being so mounted on said upper shoe that the central pad will be the first to contact the sheet and urge it into the corresponding female die cavity and the two pads on both sides of said central pad will be the next to contact and act on the sheet and so on progressively for the full length of the upper shoe.

5. Apparatus for forming a plurality of corrugations simultaneously in a metallic sheet comprising a lower shoe mounting a plurality of female dies having cavities of desired configurations, an upper shoe movable vertically towards and away from said lower shoe and mounting male dies corresponding to said female dies, and spring-loaded pads carried by said upper shoe extending through said upper shoe and adapted to contact the sheet and cause it to enter said female die cavities without distortion prior to the final stroke wherein said male dies act to press and distort the sheet in said female dies, the central pad extending outwardly of said upper shoe a distance greater than that of the next two pads on both sides of said central pad and so on for all of said pads so that the sheet will be urged without distortion into the female cavities sequentially from the central cavity outwardly to the cavities at both ends of the lower shoe prior to the final stroke wherein said male dies act to press and distort the sheet in said female dies.

References Cited

UNITED STATES PATENTS

| | | | |
|---|---|---|---|
| 689,280 | 12/1901 | Brown | 72—475 |
| 1,771,028 | 7/1930 | Bronson et al. | 72—384 |
| 1,941,078 | 12/1933 | Eriksson | 72—385 |
| 2,397,582 | 4/1946 | Watt et al. | 72—405 |
| 2,510,024 | 5/1950 | Mayer | 72—397 |

CHARLES W. LANHAM, *Primary Examiner.*

E. M. COMBS, *Assistant Examiner.*